US005538308A

United States Patent [19]

Floe

[11] Patent Number: 5,538,308
[45] Date of Patent: Jul. 23, 1996

[54] PORTABLE VEHICLE RAMP

[76] Inventor: Wayne G. Floe, HCR3 Box 609, McGregor, Minn. 55760

[21] Appl. No.: 267,656

[22] Filed: Jun. 29, 1994

[51] Int. Cl.$^6$ .................................................. B62D 33/03
[52] U.S. Cl. .......................................... 296/61; 414/537
[58] Field of Search ............................ 296/61; 414/537; 14/71.1

[56] References Cited

U.S. PATENT DOCUMENTS

| | | | |
|---|---|---|---|
| 2,779,489 | 1/1957 | Boom | 414/537 |
| 3,339,968 | 9/1967 | Hall | 296/61 |
| 3,352,440 | 11/1967 | Wilson | 296/61 X |
| 3,510,015 | 5/1970 | Roshaven | 296/61 X |
| 3,737,058 | 6/1973 | Johnson | 414/537 |
| 3,818,528 | 6/1974 | Petersen | 414/537 X |
| 4,478,549 | 10/1984 | Stelly et al. | 414/537 |
| 4,722,109 | 2/1988 | Mountz | 414/537 X |
| 4,761,847 | 8/1988 | Savage et al. | 414/537 X |
| 4,995,129 | 2/1991 | Comardo | 414/537 X |
| 5,096,362 | 3/1992 | Best | 414/537 |
| 5,133,634 | 7/1992 | Gingrich et al. | 414/537 |
| 5,169,202 | 12/1992 | Cupp et al. | 296/61 X |
| 5,211,437 | 5/1993 | Gerulf | 296/61 |
| 5,273,335 | 12/1993 | Belnapp et al. | 296/61 |

*Primary Examiner*—Joseph D. Pape
*Attorney, Agent, or Firm*—Charles A. Johnson

[57] ABSTRACT

An improved portable ramp structure constructed of lightweight material and adapted for reliable and safe use with various transport vehicles is described. A plurality of pairs of longitudinal support members having longitudinal channels for mounting a predetermined number of cross members therebetween are shown, with ones of each of said pairs hingedly mounted to associated ones of other pairs, such the ramp may be longitudinally folded. Each of said pairs of members has a support member mounted at one end thereof for cooperating with some portion of a transport vehicle. Retention chains with associated hooks are described for removably attaching the ramp structure to the transport vehicle. The entire structure is comprised of components that are fabricated from extruded lightweight material, and cut to length for assembly.

20 Claims, 3 Drawing Sheets

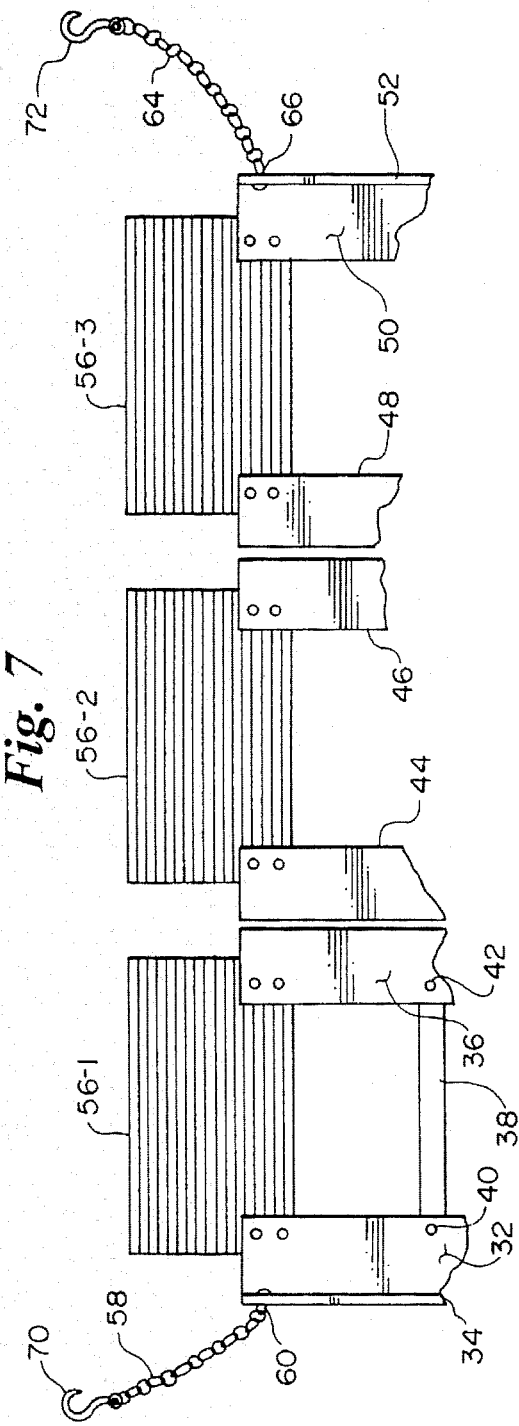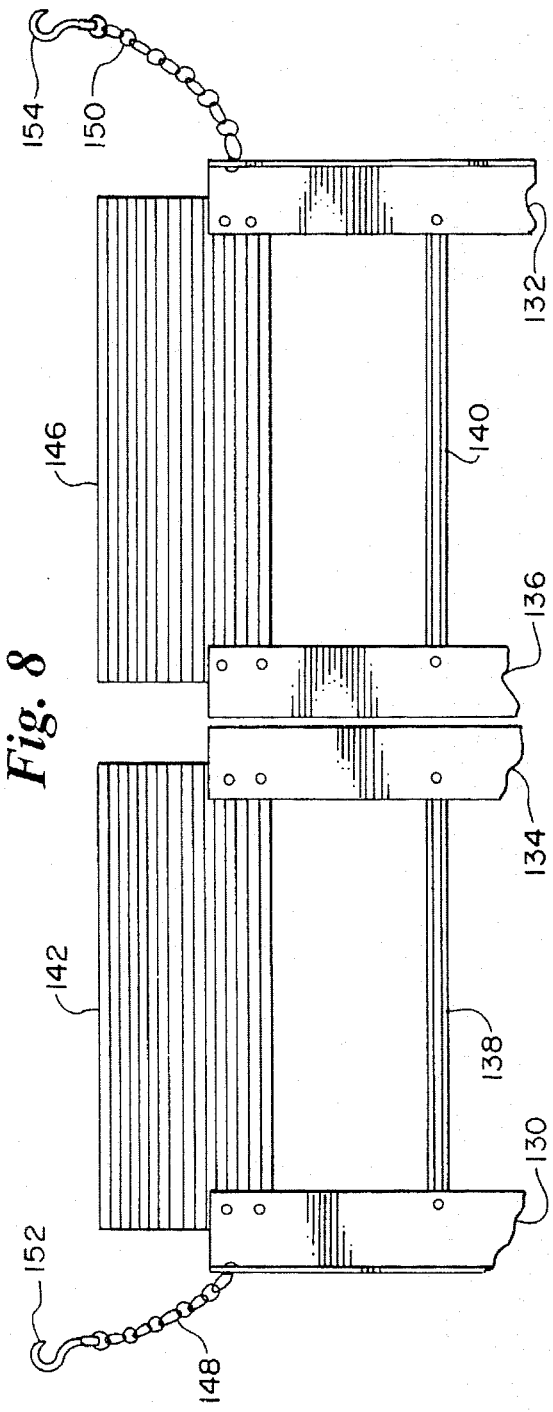

PORTABLE VEHICLE RAMP

BACKGROUND OF THE INVENTION

1. Field of the Invention

This invention relates generally to ramps for loading and unloading vehicles; and, more particularly to a strong light-weight ramp structure that is foldable and includes a structure for positioning the ramp and holding it in place during a loading or unloading operations.

2. State of the Prior Art

Various types of ramp structures have been devised and used for loading and unloading vehicles on other vehicles for transportation. Many of these prior ramp structures are hinged or otherwise mounted to the transport vehicle, and thus cannot be readily moved for use with other transport vehicles. Further, when so mounted, the transport vehicle cannot be readily used for other purposes without the mounted ramp being in the way.

For transporting a class of relatively light vehicles, such as snowmobiles, all-terrain vehicles, lawn mowers, motorcycles, and the like, transport vehicles often include towed trailers, pickup trucks, and wagons. These types of transport vehicles often have a variety of uses, only one of which may be to transport those light-weight vehicles, and mounted loading structures are unacceptable.

One type of loading apparatus involves a support surface that is movably mounted to the transport vehicle such that the support surface can be lowered to ground level to allow a vehicle to be placed thereon, and then can be raised to the level of the bed of the transport vehicle. The raising mechanisms include hydraulics, power driven cable and pulley assembles, and other forms of power structures. All of these devices add weight to the transport vehicle, remain in place unless extensive removal operations are done, are limited in use to a vehicle that is adapted to work with it, and may not be readily used with other transport vehicles.

Folding ramp structures have been developed such that the ramp is hingedly mounted to the transport vehicle, and is laterally hinged in two or more sections such that when the ramp is raised, it folds back upon itself so that it does not protrude upwardly to an unacceptable height. These types of folding ramps are most often used with very light-weight apparatus, such as lawn mowers, because the laterally folding structure is difficult to fabricate with substantial longitudinal rigidity. Such mounted, laterally folding ramps cannot readily be moved for use with other transport vehicles.

Removable ramps have long been used with transport vehicles where the ramp has hooks or other engaging members mounted at one end of the ramp. These members are arranged for cooperating with some structure on the transport vehicle to hold the end of the ramp in place when engaged. These structures are often used with livestock trucks, and while effective, are often difficult to engage and are not readily portable to other transport vehicles.

The simplest prior art ramps are constructed of planks with one end arranged to rest on the ground and the other end to be supported on the bed of the transport vehicle. While simple, this type of ramp is dangerous in that the planks routinely slide forward when loading, such that the ground end flies up when the loaded vehicle moves to the bed of the transport vehicle; and routinely slide back when unloading, such that the end supported on the bed slips off and allows the ramp and the unloading vehicle to fall to the ground. Neither of these results is acceptable.

None of the prior art ramp structures are adequate or designed to provide safety and flexibility of use with a variety of transport vehicles. Various prior art ramps have been constructed of wood, which decays and loses strength, or steel, which is heavy and tends to rust. Most are too heavy to be used by anyone other than very strong people.

OBJECTS

It is a primary objective of this invention to provide an improved ramp structure for use in loading and unloading vehicles.

Another objective of this invention is to provide an improved ramp structure that is longitudinally foldable, and had improved longitudinal rigidity.

Yet another objective of this invention is to provide an improved ramp that will not move with respect to the bed of the transport vehicle when loading or unloading.

Yet another objective of this invention is to provide an improved ramp having a support end that will allow use of the ramp with a variety of transport vehicles.

A further objective of this invention is to provide an improved ramp that is light-weight and longitudinally foldable.

Another objective of this invention is to provide an improved ramp that is constructed of durable extruded aluminum members.

Still another objective of this invention is to provide an improved ramp that can be utilized with wheeled vehicles and sliding vehicles.

Yet another objective of this invention is to provide an improved ramp that can be used in all types of weather and conditions, and is relatively maintenance free.

These and other more detailed and specific objectives will become apparent from a consideration of the following description of the invention.

SUMMARY OF THE INVENTION

The present invention includes a light-weight ramp structure that has transport vehicle engaging end support members that restrains the ramp structure from moving forward when a vehicle is loaded. Ramp restraints are provided at the same end to cooperate with the transport vehicle to prevent the ramp from sliding backward when a vehicle is unloaded. The ramp restraints include a laterally extending box beam having one side for engaging the rear end of the bed or tail gate of the transport vehicle, and a support member extending across a portion of the box beam, and arranged for engaging the bed or tail gate of the transport vehicle.

Pairs of longitudinal spaced-apart channel members are coupled to a plurality of cross members, and adjacent ones of such structures are hingedly coupled to allow longitudinal folding of the ramp.

The ramp structure is constructed of elements that are constructed of extruded light-weight material that only require cutting to appropriate lengths. The main longitudinal channels and the cross members are of a general box beam configuration. The preferred embodiment utilizes extruded aluminum to achieve a light-weight minimum maintenance structure.

A longitudinal upwardly extending lip is provided at the outside extremities of the ramp structure to assist in preventing a vehicle being loaded or unloaded from driving over the side of the ramp.

All of the component parts are integrally formed from light-weight material and cut to lengths required for assembly, thereby providing a ramp structure that can be efficiently and cost-effectively manufactured for various sizes of ramps.

BRIEF DESCRIPTION OF THE DRAWINGS

FIG. 7 is a cut-away plan view of one end of a ramp structure having three sections; and FIG. 8 is a cut-away plan view of one end of a ramp structure having two sections.

DESCRIPTION OF THE PREFERRED EMBODIMENT

Figure 1:
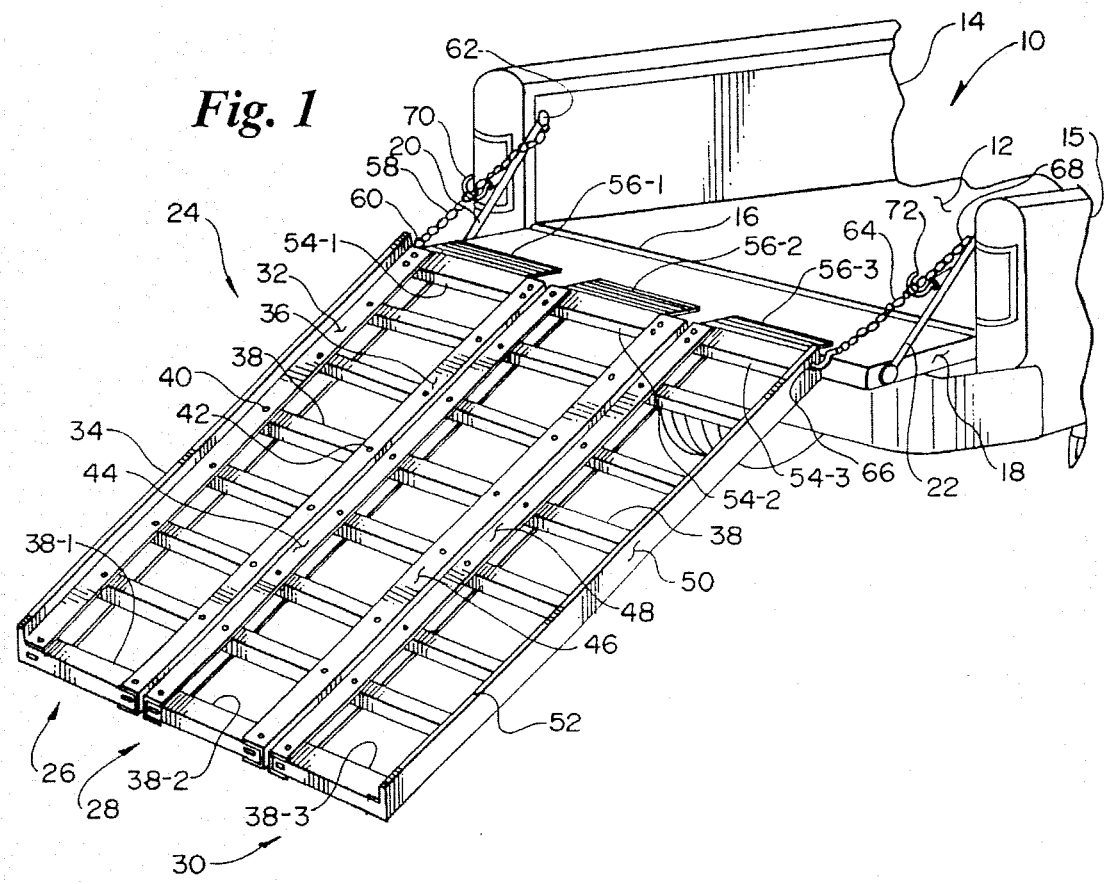
FIG. 1 is a perspective view of a ramp structure mounted to the tail gate of a transport vehicle.

FIG. 1 is a perspective view of a ramp structure mounted to the tail gate of a transport vehicle. The transport vehicle 10 is shown cut away, and includes a support bed 12 with sides 14 and 15. At the rear end 16 of bed 12 is mounted a tail gate 18. The tail gate is supported to sides 14 and 15 by braces 20 and 22, respectively. It is known that braces 20 and 22 can be cables, chains, or folding brackets. It is also known that most vehicles allow for tail gate 18 to be removed. If the transport vehicle 10 has the tail gate removed, access to bed 12 is directly at end 16.

The improved portable vehicle ramp, identified generally by arrow 24, is comprised of three longitudinal sections, with the left-most section identified by arrow 26, the center section identified by arrow 28, and the right-most section identified by arrow 30.

Section 26 is made up of side member 32 along which raised lip 34 extends. The raised lip 34 is constructed and arranged to assist preventing vehicles being loaded or unloaded from moving off ramp 24 to the left side.

Side member 32 is basically a box beam with a pair of spaced apart portions forming a longitudinal channel in which ends of cross members 38 are located and mounted. In a similar manner, side member 36 is a box beam with a pair of spaced apart portions forming a second longitudinal channel in which the opposite ends of cross members 38 are located and mounted. The fastening of cross members 38 to side member 32 is by pin 40, and the fastening of the other ends of cross members 38 to side member 36 is by pin 42. It is understood that the fastening is intended to provide a rigid structure, and pins 40 and 42 can be rivets, bolts with nuts affixed, or any other type of structure to make interconnection.

In a similar fashion, center section 28 has side members 44 and 46, each having longitudinal channels for retaining associated ends of cross members 38. Right-most section 30 has member 48 and right side member 50, each having longitudinal channels for retaining associated ends of cross members 38. Side member 50 has lip 52 extending along its length, and arranged to assist in preventing vehicles being loaded or unloaded from leaving ramp 24 off to the right.

Sections 26, 28, and 30 have end cross members 38-1, 38-2, and 38-3, respectively, for engaging the loading level surface.

Sections 26, 28, and 30 have load cross members 54-1, 54-2, and 54-3, respectively, each arranged to bear against tail gate 18 (or bed edge 16 absent a tail gate) to hold ramp 24 from sliding up and forward as a vehicle is loaded up ramp 24. Load cross members 54-1, 54-2, and 54-3 have support members 56-1, 56-2, and 56-3, respectively, for resting on the load bearing surface of the transport vehicle 10. The unique structure of load cross members 54-1, 54-2, and 54-3 will be described in more detail below. The thickness of support members 56-1, 56-2, and 56-3 is such that a vehicle being unloaded from the transport vehicle 10 will easily move onto ramp 24 without causing any lateral displacement of the ramp.

Left side member 32 has chain 58 mounted at end 60, and chain 58 has end 62 adapted for removable fastening to side 14 of transport vehicle 10. Similarly, right side member 50 has chain 64 connected at aperture 66, and arranged such that end 68 can be removably fastened to side 15. Chains 58 and 64 are arranged with hooks 70 and 72 at ends 62 and 64, respectively, so that chains 58 and 64 can be looped through whatever connecting structures are available, and the hooks 70 and 72 engage chains 58 and 64 to hold ramp 24 tightly against tail gate 18 at load cross members 54-1, 54-2, and 54-3. This arrangement prevents ramp 24 from moving laterally away from the transport vehicle when a vehicle is unloaded.

Longitudinal sections 26 and 28 are hingedly coupled along side members 36 and 44, and arranged to rotate in a first direction, for example counterclockwise. Longitudinal sections 28 and 30 are also hingedly coupled along side members 46 and 48, and are arranged to rotate in a second direction, for example clockwise. The hinged movement will be described in more detail below, but it is understood that the hinging is such that tile ramp 24 may be folded up to a width of one of the sections when not in use. Such a folding structure for ramp 24 allows rigidity of the longitudinal sections 26, 28, and 30 for strength, while allowing ramp 24 to folded to a compact width for storage or for transport on transport vehicle 10. With a characteristic opened width of 45 inches, the ramp 24 folds to width of 15 inches.

The length of ramp 24 can be selected for the type of transport vehicle and the desired slope for loading and unloading. For most trailers a length of about six feet provides an acceptable slope, and for light pickup trucks a length of about eight feet provides an acceptable slope.

The spacing of cross members 38 is selected such that it is substantially less that the wheel diameter of any vehicle that is to be loaded or unloaded. This allows the wheels to engage successive cross members and "walk" up or down the ramp without falling through.

Figure 2:
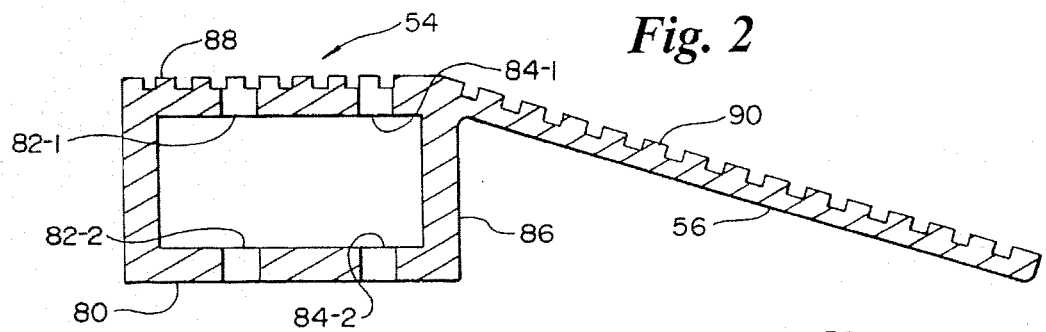
FIG. 2 is a cross-sectional view of the support member that is adapted for cooperating with the transport vehicle.

FIG. 2 is a cross-sectional view of the support member that is adapted for cooperating with the transport vehicle. Support member 54 is comprised of a box beam portion 80 having paired apertures 82-1/82-2, and 84-1/84-2 through which pins are passed to fasten the support member to an associated longitudinal side member. The box beam structure 80 has a surface 86 for cooperating with the edge of a tail gate 18 or the rear surface 16 of bed 12, thereby preventing lateral movement forwardly of ramp 24 during any loading operation. The upper surface 88 of box beam 80 and the upper surface 90 of support member 56 have longitudinal grooves for providing a non-slip surface. The entire structure is formed from extruded aluminum. The overall dimensions and the thickness of the various parts are selected to provide the desired necessary strengths for the types of vehicles to be loaded or unloaded.

Figure 3:
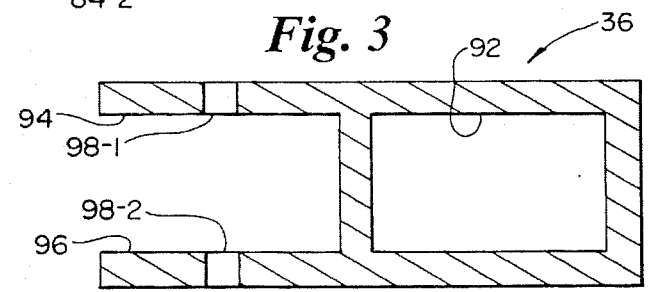
FIG. 3 is a cross-sectional view of the internal longitudinally extending channel member.

FIG. 3 is a cross-sectional view of the internal longitudinally extending channel member. By way of example, consider member 36, which is similar to members 44, 46, and 48, where there is a box beam portion 92 having parallel members 94 and 96 formed therewith to thereby define a longitudinal channel. Apertures 98-1 and 98-2 are formed in channel members 94 and 96, respectively, to allow for pin 42 to pass therethrough, and affix cross member 38 between channel members 94 and 96. While the surface of member 36 is illustrated as smooth, it should be understood that it may be formed with grooves of the type described above.

Figure 4:
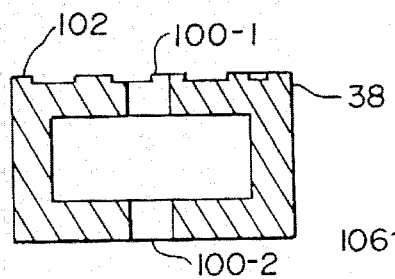
FIG. 4 is a cross-sectional view of the cross member.

FIG. 4 is a cross-sectional view of the cross member. The cross members 38 are generally rectangular in cross-section and are formed as a box beam. Apertures 100-1 and 100-2 are formed in the upper and lower walls, respectively, and are arranged to cooperate with apertures 98-1 and 98-2 in the internal channel members 94 and 96 to affix the cross member 38 thereto when a pin is inserted. An upper surface 102 has longitudinal ridges to provide assistance to traction as a vehicle moves across it when loading or unloading. The dimension of cross member 38 is such that it fits snugly between channel walls 94 and 96. The cross members 38 are formed by extruding aluminum in the preferred embodiment, to thereby make a light-weight durable element.

Figure 5:
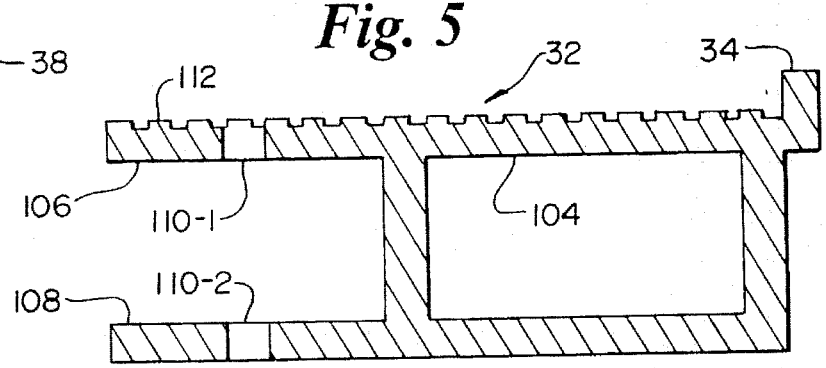
FIG. 5 is a cross-sectional view of the outer longitudinal channel member with the outer lip.

FIG. 5 is a cross-sectional view of the outer longitudinal channel member with the outer lip. Longitudinal member 32 is illustrative, and has upwardly extending lip 34 along its length. A portion of member 32 is a box beam 104, and it has parallelly disposed channel defining members 106 and 108 arranged for cooperating with an associated end of cross members 38. Apertures 110-1 and 110-2 are arranged to accept the pin structure (not shown here) to couple member 32 to cross member 38. The upper surface 112 has ridges formed thereon, and the entire member is formed from extruded aluminum in the preferred embodiment.

Figure 6:
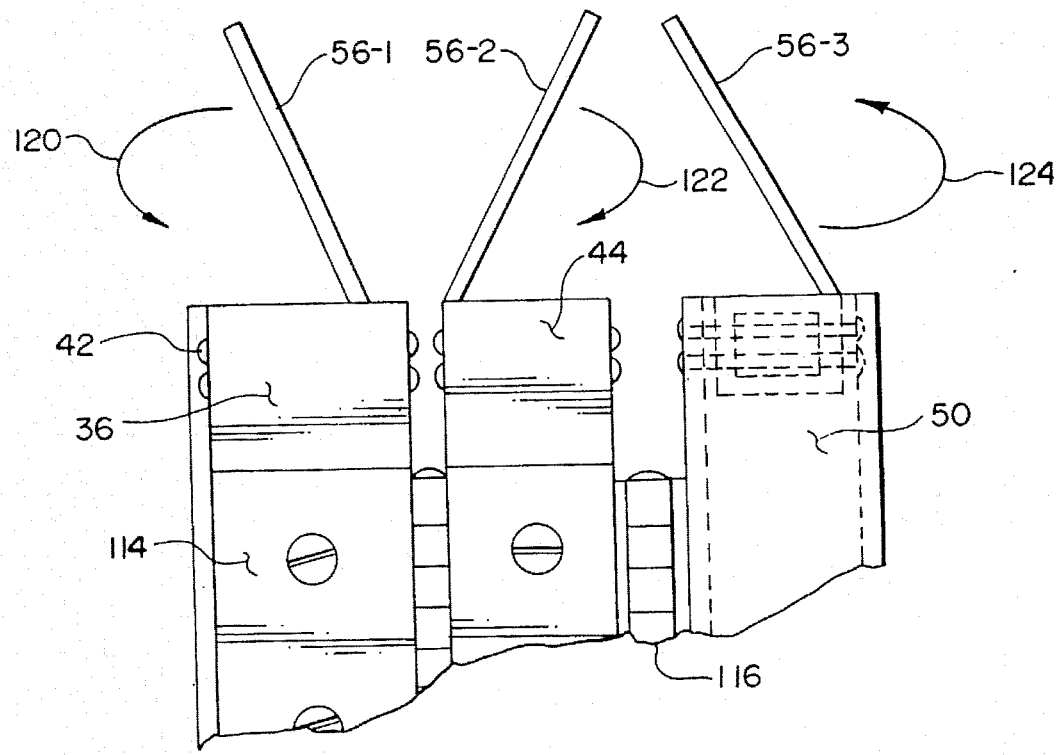
FIG. 6 is a cut-away view illustrating the transport vehicle engaging end of the ramp structure when folded up.

FIG. 6 is a cut-away view illustrating the transport vehicle engaging end of the ramp structure when folded up. In this view the cut-away hinge 114 is shown mounted to the edge surfaces of longitudinal members 36 and 44, and the outer surface of member 50 is shown. Hinge 116 is mounted at the back surfaces (not shown) of longitudinal elements 46 and 48. To unfold, member 36 moves in the direction of arrow 120, while member 44 moves in the direction of arrow 122 until the exposed surfaces engage. Simultaneously, member 50 moves in the direction of arrow 124 until the rear surfaces engage.

FIG. 7 is a cut-away plan view of one end of a ramp structure having three section. Elements have the same reference numerals as described in FIG. 1. FIG. 7 illustrates that support members 56-1, 56-2, and 56-3 are somewhat spaced apart, but that they cover a substantial portion of any bed surface upon which he ramp would rest. Chains 58 and 64 are coupled through apertures 60 and 66, respectively.

FIG. 8 is cut-away plan view of one end of a ramp structure having two sections. It is understood that a ramp structure can be constructed of two longitudinal sections. In this configuration there are a pair of outside members 130 and 132, with a pair of inside members 134 and 136. Members 130 and 134 are coupled to cross member 138, while members 136 and 132 are coupled to cross member 140. There are two support members 142 and 146. Retaining chains 148 and 150 have hooks 152 and 154, respectively. A two-section ramp can be used with non-wheeled vehicles, such as snowmobiles, or where the wheel span does work with the dimensions of the three-section ramps. It is of course understood that a ramp having more than three sections can also be made using the structures and concepts described above.

A characteristic design using extruded aluminum throughout resulted in a ramp structure weighing about twenty-seven pounds, but with the load bearing capacity to support about 1500 distributed pounds, or about 400 single point pounds.

From the drawings and the foregoing description of the preferred embodiments, it can be seen that the stated purposes and other more detailed an specific objectives of the invention have been achieved. Various modifications and extensions will become apparent to those skilled in the art within the spirit and scope of the invention. Accordingly, what is intended to be protected by Letters Patent is set forth in the appended claims.

I claim:

1. A ramp structure comprising:

a plurality of elongated members arranged in pairs, each of said plurality of elongated members having a predetermined length and a longitudinal channel along said length;

a plurality of cross members, each having first and second ends, with predetermined ones of said plurality of cross members spaced apart with each of said longitudinal channels;

a plurality of end support members, each having a length and first and second mounting ends mounted in associated ones of said longitudinal channels, and each of said plurality of end support members having a lip portion extending along at least a portion of said length and extending outwardly therefrom at a predetermined angle, whereby said plurality of end support members and associated lip portions cooperate to support the ramp structure on a transport vehicle.

2. A ramp structure as in claim 1 and further including rotatable coupling devices joining selected ones of said plurality of elongated members.

3. A ramp structure as in claim 1 and further including at least one chain having first and second chain ends, said first chain end coupled to one of said plurality of elongated members, and a fastening device coupled to said second chain end.

4. A ramp structure as in claim 2, wherein the ones of said plurality of elongated members that are not coupled together by said rotatable coupling devices include upwardly extending side structures extending along their lengths.

5. A ramp structure as in claim 4, wherein said plurality of elongated members, said plurality of cross members, and said plurality of end support members are all integrally formed from light-weight material.

6. A ramp structure as in claim 5, wherein said light-weight material is extruded aluminum.

7. A ramp structure as in claim 4, and further including a pair of flexible members each having first ends coupled to selected ones of said plurality of elongated members, and each having second ends; and a pair of fastening devices, each of said pair of fastening devices coupled to an associated second end of said pair of flexible members.

8. A ramp structure as in claim 7, wherein said pair of flexible members are chains, and said pair of fastening devices are hooks having a predetermined size that can cooperate with said chains.

9. A ramp structure as in claim 1 wherein said plurality of elongated members arranged in pairs comprises two of said pairs.

10. A ramp structure as in claim 1 wherein said plurality of elongated members arranged in pairs comprises at least three of said pairs.

11. For use in a portable ramp structure having one end to cooperate with a transport vehicle and at least a pair of elongated side members coupled together and arranged for loading and unloading vehicles from the bed of a transport vehicle, an improved end support member comprising:

an end support beam having at least one bearing surface for cooperating with the bed of the transport vehicle, and having a pair of opposed ends each for mounting at the ends of respective ones of the pair of elongated side members; and a lip member fixedly mounted along a substantial portion of said end support beam and at a predetermined angle thereto, and arranged whereby the improved end support member can cooperate with the bed of the transport vehicle to support the one end of the ramp structure thereon.

12. An improved end support member as in claim 11, wherein said end support beam comprises an elongated box beam structure.

13. An improved end support member as in claim 12, wherein said lip member comprises a substantially rectangular shaped metal structure having an edge jointed to said at least one bearing surface at an angle of less than ninety degrees.

14. An improved end support member as in claim 13, wherein at least one surface of said end support beam and said lip member have grooves therein.

15. An improved end support member as in claim 13, wherein said end support beam and said lip member are integrally formed from lightweight metal material.

16. An improved end support member as in claim 13 wherein said end support beam and said lip member are formed from extruded aluminum.

17. A portable ramp structure for use in loading and unloading from the bed of a transport vehicle comprising:

a plurality of elongated members arranged in N pairs, each of said plurality of elongated members having a predetermined length and a longitudinal channel along said length;

a plurality of cross members, each having first and second ends, with predetermined ones of said plurality of cross members spaced apart and with each of said first and second ends mounted in associated ones of said longitudinal channels;

N support members, each having a length and first and second mounting ends mounted in associated ones of said longitudinal channels, and each of said N support members having at least one bearing surface for cooperating with at least a portion of the bed of the transport vehicle and having a lip portion extending along at least a portion of said length and extending outwardly from said bearing surface at a predetermined angle less than ninety degrees;

coupling devices joining selected ones of said plurality of elongated members to allow folding of said N pairs back on adjacent ones of said N pairs;

at least one flexible member having first and second coupling ends, said first coupling end coupled to one of said plurality of elongated end members; and at least one fastening device coupled to said second coupling end.

18. A portable ramp structure as in claim 17, wherein said plurality of elongated members, said plurality of cross members, and said N support members are each integrally formed by extrusion of aluminum.

19. A portable ramp structure as in claim 18, wherein N is an integer greater than one.

20. A portable ramp structure as in claim 19, wherein N is an integer equal to three.

* * * * *